United States Patent [19]

Chapman et al.

[11] Patent Number: 4,684,885
[45] Date of Patent: Aug. 4, 1987

[54] ARRANGEMENT FOR ON-LINE DIAGNOSTIC TESTING OF AN OFF-LINE STANDBY PROCESSOR IN A DUPLICATED PROCESSOR CONFIGURATION

[75] Inventors: Harry A. Chapman, Phoenix; David J. Lauson, Glendale, both of Ariz.

[73] Assignee: GET Communication Systems Corporation, Phoenix, Ariz.

[21] Appl. No.: 795,051

[22] Filed: Nov. 4, 1985

[51] Int. Cl.$^4$ .................. G01R 31/00; G06F 11/00
[52] U.S. Cl. ........................... 324/73 R; 324/158 R; 371/9; 371/68
[58] Field of Search .............. 371/9, 68; 179/18 EE; 178/2 R; 324/73 R, 158 R

[56] References Cited

U.S. PATENT DOCUMENTS

| 4,141,066 | 2/1979 | Keiles | 371/9 |
| 4,542,506 | 9/1985 | Oe et al. | 371/9 |
| 4,644,538 | 2/1981 | Cooper et al. | 371/9 X |

Primary Examiner—Reinhard J. Eisenzopf
Assistant Examiner—Vinh P. Nguyen
Attorney, Agent, or Firm—Frank J. Bogacz; Peter Xiarhos

[57] ABSTRACT

Under normal operating conditions in an on-linne active/off-line standby duplicated processor system, only the on-line active processor is permitted access to the system's bus structure. The off-line standby processor is disconnected from the system buses. A technique is shown that allows the off-line standby processor diagnostic access to the system peripherals via the bus structure. The standby processor may then perform diagnostic testing to determine its communication ability with the system's peripheral devices. The diagnostic testing is done rapidly to avoid any loss of processor throughput. This technique also assures that the diagnostic testing will not cause faults or after the system configuration during this testing. As a result, when the off-line processor is put into active service, this transition will be made smoothly since this processor's operation has been previously verified.

16 Claims, 3 Drawing Figures

FIG. I

ARRANGEMENT FOR ON-LINE DIAGNOSTIC TESTING OF AN OFF-LINE STANDBY PROCESSOR IN A DUPLICATED PROCESSOR CONFIGURATION

BACKGROUND OF THE INVENTION

The present invention pertains to duplicated processor configurations and more particularly to an arrangement for testing a standby processor in an active/standby duplex processor configuration.

Public policy requires that telecommunication systems provide 24 hour noninterrupted service to its subscribers. In order to achieve this end, telecommunication systems typically employ multiple processors, each processor capable of sustaining the system's functions. Many of these telecommunication systems were controlled by several large processors which normally executed their program in lock step. That is, each processor executed the same instruction at the same time. Some of these lock step processor arrangements had a third party processor which compared the execution of the two other processors to determine whether these processors where executing the same instruction at the same time. In addition, for detection of mismatches of the other processors, a third party processor would determine which processor is faulty and remove it from the configuration. Processors in such a telecommunication system were all on-line, active and operational until one processor was put off-line for a fault detection. Subsequently, any faulty processor was tested and verified before being placed back on-line, active and in service.

Other telecommunication systems include processor configurations with duplicated processors operating in a standby/active configuration. That is, one processor is active and operates both duplex copies of the system's peripherals until a fault is detected. Thereafter, the faulty processor is removed from service and the previously off-line, standby processor is put active and in service. The new active processor controls both copies of all system peripherals. As a result, an off-line processor maybe put into service without having suitable diagnostic testing performed just prior to its being placed in service.

Therefore, for telecommunication system operation it is insufficient for the system to simply switch over from one processor copy to the other without suitable prior diagnostic testing of the processor copy which is being put into active service.

SUMMARY OF THE INVENTION

In a system which has a duplex processor configuration, one processor is on-line active and the other processor is off-line standby. Each processor is connectable to a first and a second set of peripheral devices. The connection of the processors to the sets of peripheral devices is accomplished via corresponding first and second peripheral buses. An arrangement for diagnostic testing of the off-line standby processor includes a bus control arrangement, a status control circuit, a logic controller and a diagnostic testing program.

The bus controller arrangement is connected to the first and second peripheral buses. The bus control arrangement operates to connect the first and second peripheral buses to the on-line active processor and also to the off-line standby processor. As a result, either processor may be connected to the two sets of peripheral devices.

A status control circuit is connected to the standby processor, to the active processor and to the bus control arrangement. The status control circuit is normally operated in response to both processors to enable the bus control arrangement to connect the first and second peripheral buses to the active processor while simultaneously disconnecting the standby processor from the first and second peripheral buses.

The logic controller is connected to the active processor, the standby processor and to the status control circuit. The logic controller operates to produce a force active signal and a force mate active signal, both active low signals. In response to the force active and force mate active signals (active low) of the logic controller, the status control circuit operates the bus control arrangement to connect the first and second peripheral buses to the standby processor while retaining the connection of the first and second peripheral buses to the active processor.

The diagnostic program is connected to the standby processor, to the logic controller and to the first and second peripheral buses. The diagnostic program verifies the connection of the standby processor to the two sets of peripheral devices via the first and second peripheral buses.

In response to the operation of the diagnostic program, the logic controller operates to set the force active and force mate active signals inactive (logic high). The status control circuit operates in response to the inactive force active and force mate active signals to disconnect the standby processor from the first and second peripheral buses, while retaining the connection of the first and second peripheral buses to the active processor.

DESCRIPTION OF THE PREFERRED EMBODIMENT

Figure 1:
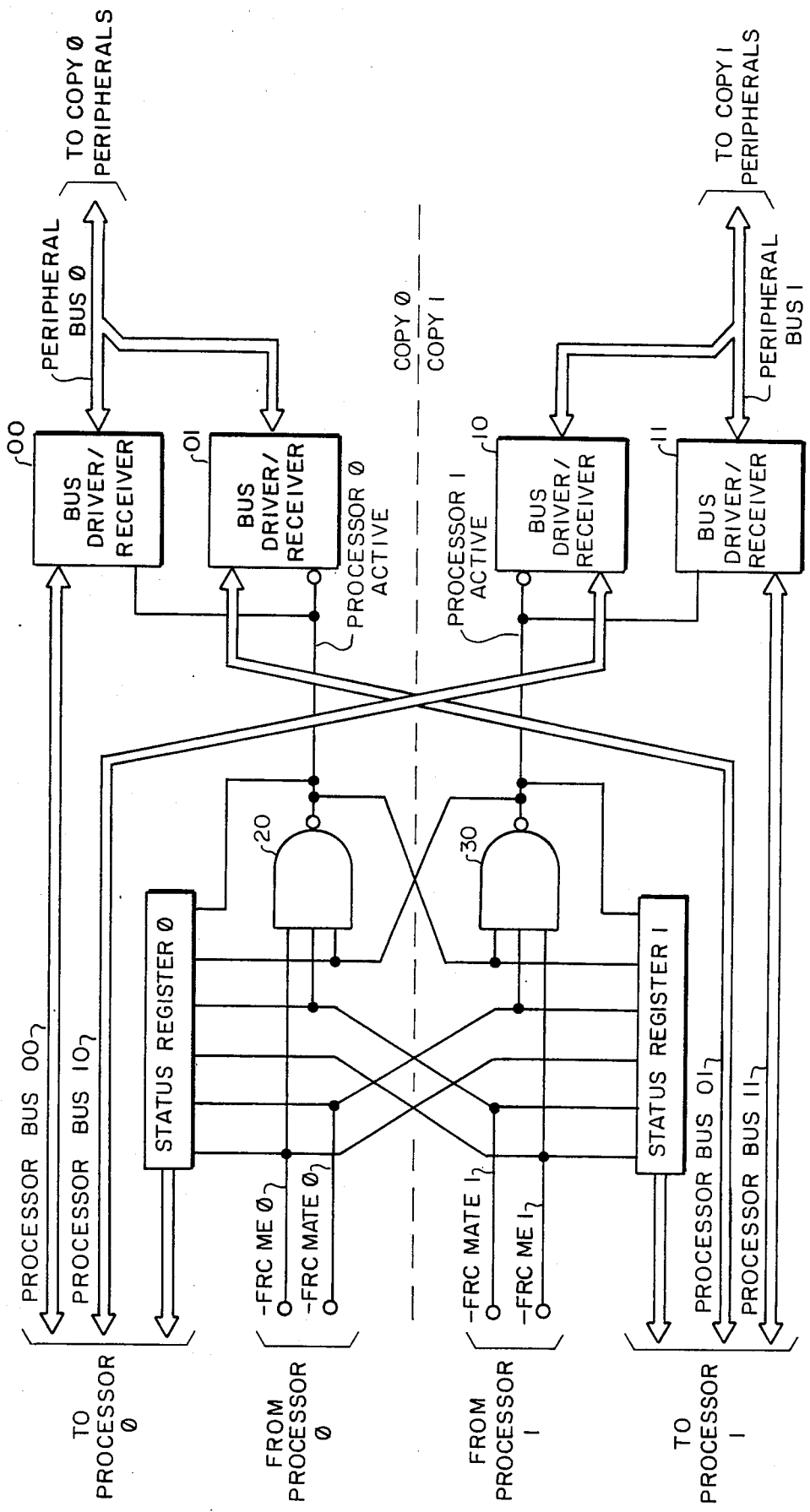
FIG. 1 is a schematic diagram of an active/standby duplex processor bus configuration with diagnostic control circuitry.

FIG. 1 shows the circuitry portion of the off-line standby processor diagnostic test logic. The circuitry shown is the bus interconnection and control logic. This circuitry is divided into two identical duplex copies, copy 0 and copy 1 (shown by the dashed line).

Processor 0 is connected to all copy 0 peripheral devices via the peripheral bus 0 and bus driver/receiver 00 and processor bus 00. Each of the peripheral buses shown includes both address and data buses. The peripherals which are connected to each peripheral bus include such duplicated devices such as system random access memory (RAM), input/output devices and other network communication devices.

Processor 0 is also connected to peripheral bus 1 via processor bus 10 and bus driver/receiver 10. This connection allows processor 0 to communicate with all copy 1 peripheral devices which are connected to peripheral bus 1. As a result, processor 0 may synchronously operate two copies of each peripheral device, one copy of which is connected to peripheral bus 0 and the other copy of which is connected to peripheral bus 1.

Processor 0 is also connected to status register 0. Status register 0 is a grouping of latch devices which contain information of various system functions. Processor 0 is connected to status register 0, status register 1, NAND gate 20 via the −FRC ME 0 lead and to NAND gate 30 via the −FRC MATE 0 lead.

The connection of processor 1 to peripheral buses 0 and 1 is similar to that described for processor 0 above. Processor 1 is connected to peripheral bus 1 via bus driver/receiver 11 and processor bus 11. Processor 1 is connected to peripheral bus 0 via processor bus 01 and bus driver/receiver 01.

Status register 1 is a group of latches similar to status register 0, except that status register 1 contains system information pertinent to copy 1 of the system. Processor 1 is connected to status register 1, status register 0, to NAND gate 30 via the −FRC ME 1 lead, and NAND gate 20 via the −FRC MATE 1 lead.

In addition, NAND gates 20 and 30 are connected in a flip-flop configuration. The output of NAND gate 20 (the Q output of the combined NAND gates 20 and 30) is the PROCESSOR 0 ACTIVE signal and is transmitted to both status registers 0 and 1. The output of flip-flop 30 (which is also the −Q output of the combined flip-flop of NAND gates 20 and 30) is the PROCESSOR 1 ACTIVE signal which is also transmitted to status register 0 and 1.

The output of NAND gate 20 is connected to bus driver/receivers 00 and 01 via the PROCESSOR 0 ACTIVE lead. The PROCESSOR 0 ACTIVE lead is inverted before being transmitted to bus driver/receiver 01.

NAND gate 30 is connected to bus driver/receivers 10 and 11 via the PROCESSOR 1 ACTIVE lead. The PROCESSOR 1 ACTIVE signal is inverted before being transmitted to bus driver/receiver 10.

In the present system configuration, one processor is active and the other is standby. The active processor is connected to both peripheral buses 0 and 1 and the standby processor is disconnected from these peripheral buses. The remaining portion of the system software control logic will be illustrated by example. For this example, it will be assumed that processor 0 is on-line and active and that processor 1 is off-line and standby. Therefore, the object of this arrangement is to execute diagnostic testing of processor 1 prior to placing it on-line and active. For the configuration in which processor 1 is on-line active and processor 0 is off-line and standby, the activities of the two processors will be reversed.

Figure 2:
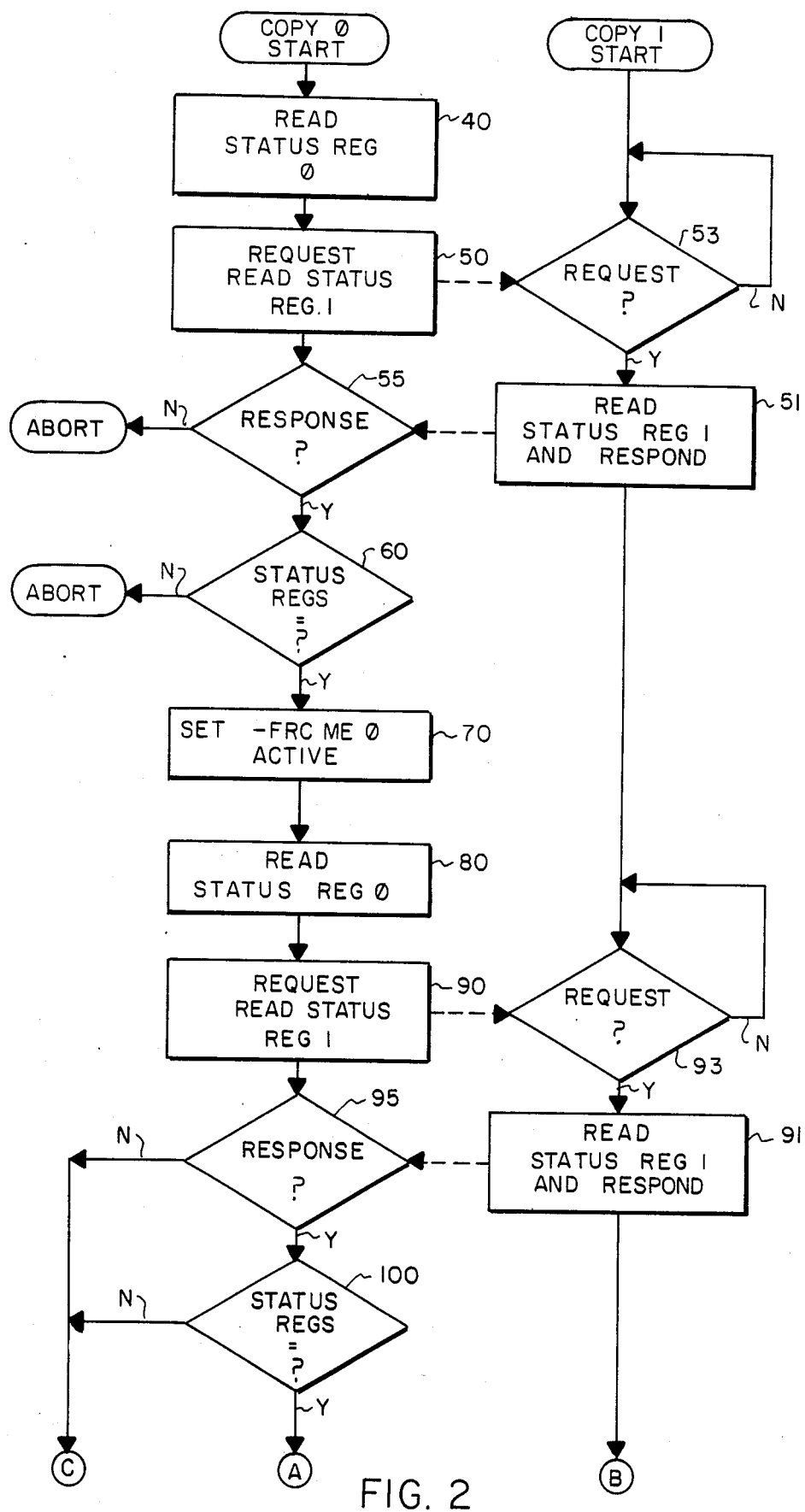
FIG. 2 a flow chart of the system software operation for diagnostic testing of a standby processor in a duplex configuration.
Figure 3:
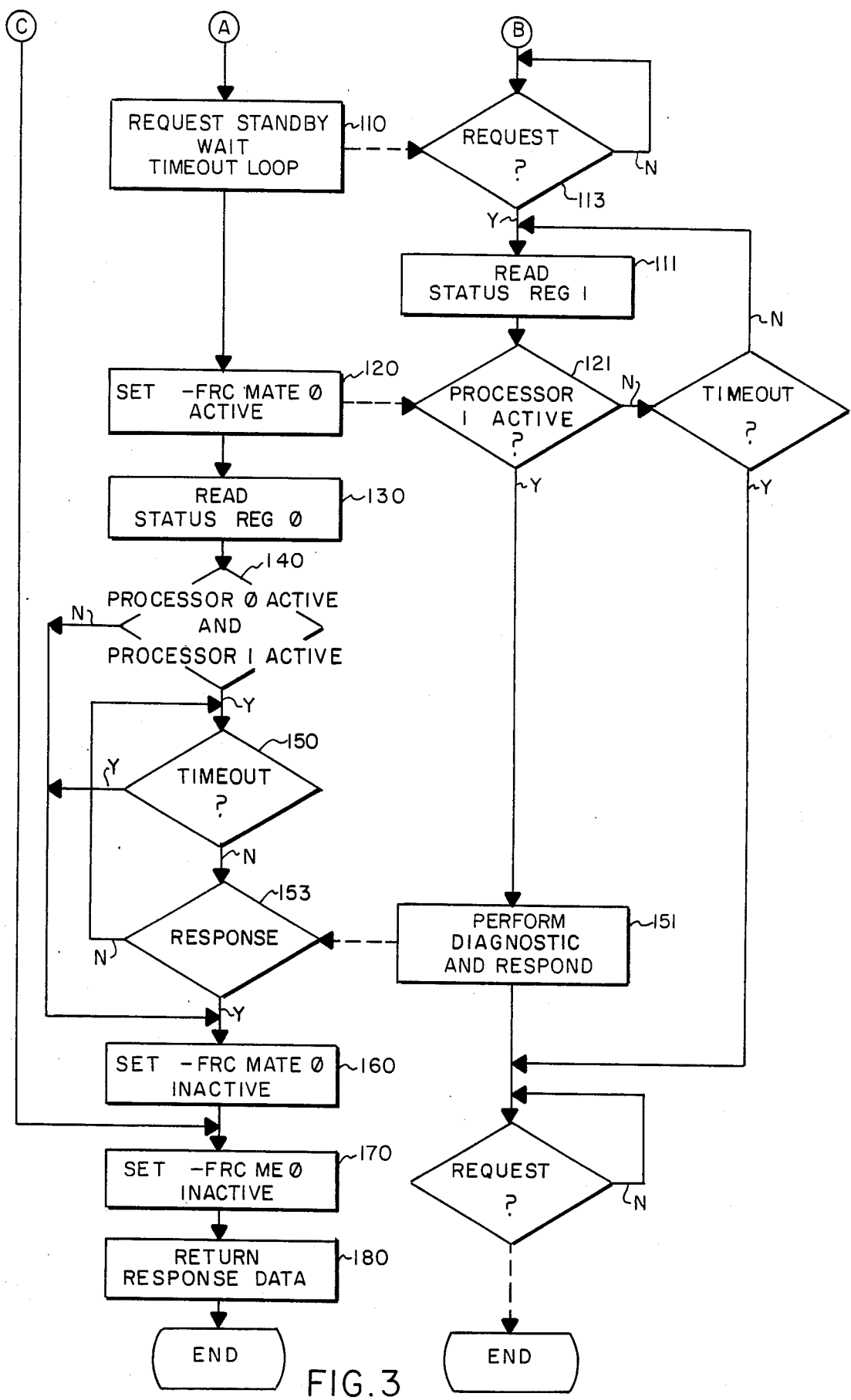
FIG. 3 is a flow chart of the system software operation for diagnostic testing of a standby processor in a duplex configuration.

Referring to FIGS. 2 and 3, the software control logic of the present invention is shown. A portion of the instructions comprising this program are located in random access memory (not shown) connected to both peripheral buses 0 and 1. These instructions will cause the active processor to read the status register of the active copy 40. In this case, the active copy is processor 0. Next, processor 0 will request that processor 1 read the status register of the standby copy via a communication channel (not shown) 50, in this case status register 1. Processor 1 is waiting for the request 53. Processor 1 transfers the status register 1 contents to processor 0, 51. Processor 0 waits for the transfer 55. The dashed lines of FIGS. 2 and 3 indicate requests for status register reads and the data response.

Status register 0 and 1 will be compared to determine whether they are identical 60. If there is any mismatch, the software will abort any further activity. If the contents of status registers 0 and 1 are identical, processor 0 will force itself to be the active processor by setting the −FRC ME 0 signal active (logic low) 70. Again, processor 0 will read status register 0, 80. Processor 0 requests processor 1 to read status register 1, 90. Processor 1 waits for the request 93. Processor 1 transfers the contents of status register 1 to processor 0, 91. Processor 0 waits for the transfer 95. If there is no response, the process is aborted. The status registers are compared to determine whether they are identical 100. If the status registers are not identical the program again will abort further processing 160.

The software comprising processing steps 40 through 110, inclusive, is contained in both copies of random access memory, one copy being connected to peripheral bus 0 and the other copy being connected to peripheral bus 1. For an identical comparison of status registers 0 and 1 in block 100, the last instruction of the RAM resident portion of the logic will transfer control to software located in a local read only memory (ROM not shown). Each processor has a local ROM associated with it.

The ROM logic of processor 0 will cause processor 0 to transmit a message to processor 1 via a separate communication channel. Processor 0 is waiting for a request 113. This message indicates that the standby processor, processor 1, is to wait in a loop and read status register 1, 111 until it senses the PROCESSOR 1 ACTIVE signal 121. Next, processor 0 will set the signal −FRC MATE 0 active (logic low) 120.

Processor 0 determines whether status register 0 indicates that both PROCESSOR 0 ACTIVE and PROCESSOR 1 ACTIVE signals are both present 140. If the abort condition is not satisfied, ROM logic of processor 0 immediately removes −FRC MATE 0, and the program aborts further processing 160.

If status register 0 does indicate that PROCESSOR 0 ACTIVE and PROCESSOR 1 ACTIVE signals are present, the ROM software of processor 0 now begins timing a time out period of approximately 3 milliseconds 150. Since, processor 0 is now executing a wait loop, processor 0 is not utilizing peripheral buses 0 or 1 to access memory or any other peripheral device. As a result of processor 0 setting active the −FRC MATE 0 signal, processor 1 senses via status register 1 that PROCESSOR 1 ACTIVE signal is present, allowing it to leave the loop 121 and continue its processing.

The PROCESSOR 1 ACTIVE signal enables peripheral bus 1 to be connected to processor 1 via bus driver/receiver 11 and processor bus 11. PROCESSOR 1 ACTIVE also disables peripheral bus 1 from processor bus 10 via bus driver/receiver 10. Processor 1 has control copy 1 of the peripheral buses and devices of copy 1.

Processor 1 performs its diagnostic testing 151. Processor 0 waits for a response of diagnostic programs 153. This testing includes basic verification of processor 1's ability to transmit and receive data in conjunction with its copy of peripheral device. All diagnostic testing conducted by processor 1 must be complete within the 3 milliseconds time out period being measured by processor 0, 150. If the active processor times out before the standby processor has completed its diagnostic testing 151, status registers 0 and 1 are reset accordingly and control is returned to the active processor (in this case processor 0) 160.

When the standby processor, processor 1, has completed its diagnostic testing, it transmits a completion message to the active processor, processor 0, 153. After the completion message is received by processor 0, it sets the −FRC MATE 0 signal inactive (logic high) thereby removing PROCESSOR 1 ACTIVE signal 160. The PROCESSOR 1 ACTIVE signal then disables bus driver/receiver 11 and re-enables driver/receiver 10. This removes processor 1 from the peripheral bus structure, since the PROCESSOR 1 ACTIVE signal is logic low and PROCESSOR 0 ACTIVE signal has remained logic high.

The last instruction of the local ROM of processor 0 now transfers control to the peripheral RAM control logic. Processing steps 70 through 160 inclusive are located in the local ROM of processor 0 or 1 as indicated above.

A portion of this logic in the peripheral RAM now sets the −FRC ME 0 signal inactive (logic high) 170. The standby processor, processor 1, has transmitted the results of the diagnostic test to the active processor, processor 0, 151. The RAM program logic then returns to the calling program 180. The active processor then analyzes these signals to determine whether processor 1 is able to be placed on-line.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a duplex processor configuration system having an on-line active processor and an off-line standby processor, an arrangement for diagnostic testing of said off-line standby processor comprising:
 - first and second sets of peripheral devices;
 first and second processor buses connected to said on-line active processor;
 first and second peripheral buses connected to said corresponding first and second sets of peripheral devices respectively, said first and second peripheral buses being operated to connect said on-line active processor to said first and second sets of peripheral devices via said first and second processor buses;
 bus control means connected to said first and second processor buses, to said first and second peripheral buses, said bus control means being operated to connect said first and second peripheral buses to said on line active processor via said active processor's first and second processor buses and to said off-line standly processor via said standby processor's first and second processor buses;
 status control means connected to said standby processor, to said active processor and to said bus control means, said status control means being normally operated in response to force active and force mate active signals of said active and said standby processor to enable said bus control means to connect said first and second peripheral buses to said active processor via said active processor's first and second processor buses and to disconnect said standby processor's first and second processor buses from said first and second peripheral buses;
 each said processor including logic control means for producing signals for transmission to said status control means;
 said status control means being further operated in response to a first value of said force active signal and of said force mate active signal to connected said first and second peripheral buses to said standby processor via said first and second processor buses while retaining said connection of said first and second peripheral buses to said active processor;
 each said processor further including diagnostic means, said diagnostic means being operated to verify said connection of said standby processor to said first and second sets of peripheral devices via said first and second peripheral buses;
 said logic control means being further operated in response to said diagnostic means to produce said force active and said force mate active signals of a second value; and
 said status control means being further operated in response to said force active signal and said force mate active signals of said second value to disconnect said standby processor from said first and said second peripheral buses while retaining said connection of said first and second peripheral buses to said active processor.

2. An arrangement for diagnostic testing of an off-line standby processor as claimed in claim 1, said bus control means including:
 first bus driver/receiver means connected between said first peripheral bus and said first processor bus of one of said processors;
 second bus driver/receiver means connected between said second peripheral bus and said second processor bus of said one processor;
 third bus driver/receiver means connected between said first peripheral bus and said first processor bus of another of said processors; and
 fourth bus driver/receiver means connected between said second peripheral bus and said second processor bus of said other processor.

3. An arrangement for diagnostic testing of an off-line standby processor as claimed in claim 2, said status control means including:
 register means, including first and second registers, connected to said standby processor and said active processor, said register means being operated to store a plurality of status signals; and
 flip-flop means connected to said standby processor, to said active processor, to said register means and to each of said bus driver/receiver means, said flip-flop means being operated to produce first and second processor active signals of a first value for enabling said bus driver/receiver means to connect said first and second peripheral buses to said one processor and said flip-flop means being operated to produce said first and second processor active signals of a second value for connecting said first and second peripheral buses to said other processor.

4. An arrangement for diagnostic testing of an off-line standby processor as claimed in claim 3, said flip-flop means including a plurality of NAND gating means.

5. An arrangement for diagnostic testing of an off-line standby processor as claimed in claim 4, said logic control means including:

first means for comparing said status signals of said first and second registers, said first means for comparing being operated to produce an indication of an identical comparison of said first and second registers;

first means for setting operated in response to said first means for comparing, said means for setting being operated in response to said identical comparison to set said force active signal to said first value; and second means for comparing operated in response to said first means for setting, said second means for comparing being operated to produce an indication of an identical comparison of said first and second registers.

6. An arrangement for diagnostic testing of an off-line standby processor as claimed in claim 5, said logic control means further including means for waiting, said means for waiting being operated to delay a predetermined amount of time before performing other tasks.

7. An arrangement for diagnostic testing of an off-line standby processor as claimed in claim 6, said logic control means further including second means for setting operated in response to said second means for comparing, said second means for setting being operated in response to said identical comparison of said second means for comparing to set said force mate active signal to said first value.

8. An arrangement for diagnostic testing of an off-line standby processor as claimed in claim 7, said logic control means further including:

first means for testing operated in response to said second means for setting, said first means for testing being operated to verify that one of said status signals corresponding to said standby processor is equal to said first value of said force mate active signal; and means for timing operated in response to said first means for testing, said means for timing being operated to suspend said active processor operation for a predetermined time interval and to produce a time out signal for expiration of said interval.

9. An arrangement for diagnostic testing of an off-line standby processor as claimed in claim 8, said logic control means further including second mean for testing operated in resonse to said means for waiting, said second means for testing being operated to inhibit said delay for said predetermined amount of time of said means for waiting.

10. An arrangement for diagnostic testing of an off-line standby processor as claimed in claim 9, said diagnostic means being further operated in response to said second means for testing and said diagnostic means being operated in response to said inhibited particular cyclic function.

11. An arrangement for diagnostic testing of an off-line standby processor as claimed in claim 10, said logic control means further including:

third means for setting operated in response to said diagnostic means, said third means for setting being operated in response to said diagnostic means to set said force active signal to said second value; and fourth means for setting being operated in response to said third means for setting, said fourth means for setting being operated to set said force mate active signal to said second value.

12. An arrangement for diagnostic testing of an off-line standby processor as claimed in claim 11, said third means for setting being further operated in response to said second means for comparing and said third means for setting being operated in response to a non-identical comparison of said secnnd means for comparing.

13. An arrangement for diagnostic testing of an off-line standby processor as claimed in claim 12, said third means for setting being further operated in response to said first means for testing and said third means for setting being operated in response to a non-equality condition of said first means for testing.

14. An arrangement for diagnostic testing of an off-line standby processor as claimed in claim 13, said third means for setting being further operated in response to said means for timing and said third means for setting being operated in response to said time out signal.

15. An arrangement for diagnostic testing of an off-line standby processor as claimed in claim 14, said logic control means further including means for transmitting, said means for transmitting being operated to send data corresponding to said verification of said connections of said standby processor to said first and second sets of peripheral devices.

16. An arrangement for diagnostic testing of an off-line standby processor as claimed in claim 15, said logic control means further including means for receiving operated in response to said means for transmitting, said means for receiving being operated in response to said means for transmitting to receive and store said data from said standby processor.

* * * * *